(12) United States Patent
Baderdinni et al.

(10) Patent No.: US 8,397,023 B2
(45) Date of Patent: Mar. 12, 2013

(54) SYSTEM AND METHOD FOR HANDLING IO TO DRIVES IN A MEMORY CONSTRAINED ENVIRONMENT

(75) Inventors: Anant Baderdinni, Lawrenceville, GA (US); Allen Kelton, Castle Rock, CO (US); Michael Richmond, Seattle, WA (US)

(73) Assignee: LSI Corporation, Milpitas, CA (US)

( * ) Notice: Subject to any disclaimer, the term of this patent is extended or adjusted under 35 U.S.C. 154(b) by 345 days.

(21) Appl. No.: 12/972,432

(22) Filed: Dec. 18, 2010

(65) Prior Publication Data

US 2012/0159070 A1    Jun. 21, 2012

(51) Int. Cl.
*G06F 12/04* (2006.01)
(52) U.S. Cl. .................. 711/114; 711/113; 711/118
(58) Field of Classification Search .............. 711/113, 711/114, 118
See application file for complete search history.

(56) References Cited

U.S. PATENT DOCUMENTS

| | | | |
|---|---|---|---|
| 5,509,132 A | 4/1996 | Matsuda et al. | |
| 2010/0057990 A1* | 3/2010 | Mizuno et al. | 711/114 |
| 2010/0257306 A1* | 10/2010 | Kawaguchi | 711/103 |
| 2011/0202722 A1* | 8/2011 | Satran et al. | 711/114 |

* cited by examiner

*Primary Examiner* — John Lane
(74) *Attorney, Agent, or Firm* — Prakash Nama; Global IP Services, PLLC

(57) ABSTRACT

A system and method for handling IO to drives in a RAID system is described. In one embodiment, the method includes providing a multiple disk system with a predefined strip size. IO request with a logical block address is received for execution on the multiple disk system. A cache line size from a plurality of cache line sizes is allocated, based on the available memory for allocation to cache line. A plurality of sub-IO requests with a sub-strip size is generated, where the sub-strip size is smaller than the strip size, based on the allocated cache line size. The generated sub-IO commands are executed on the multiple disk system.

12 Claims, 9 Drawing Sheets

| STRIPE NO. | PD LBA | PD 0 | PD 1 | PD 2 |
|---|---|---|---|---|
| 16 | 800-87F | VD LBA 1080-10FF | PARITY 10* | VD LBA 1000-107F |
| 15 | 780-7FF | VD LBA F00-F7F | VD LBA F80-FFF | PARITY F* |
| 14 | 700-77F | PARITY E* | VD LBA E00-E7F | VD LBA E80-EFF |
| 13 | 680-6FF | VD LBA D80-DFF | PARITY D* | VD LBA D00-D7F |
| 12 | 600-67F | VD LBA C00-C7F | VD LBA C80-CFF | PARITY C* |
| 11 | 580-5FF | PARITY B* | VD LBA B00-B7F | VD LBA B80-BFF |
| 10 | 500-57F | VD LBA A80-AFF | PARITY A* | VD LBA A00-A7F |
| 9 | 480-4FF | VD LBA 900-97F | VD LBA 980-9FF | PARITY 9* |
| 8 | 400-47F | PARITY 8* | VD LBA 800-87F | VD LBA 880-8FF |
| 7 | 380-3FF | VD LBA 780-7FF | PARITY 7* | VD LBA 700-77F |
| 6 | 300-37F | VD LBA 600-67F | VD LBA 680-6FF | PARITY 6* |
| 5 | 280-2FF | PARITY 5* | VD LBA 500-57F | VD LBA 580-5FF |
| 4 | 200-27F | VD LBA 480-4FF | PARITY 4* | VD LBA 400-47F |
| 3 | 180-1FF | VD LBA 300-37F | VD LBA 380-3FF | PARITY 3* |
| 2 | 100-17F | PARITY 2* | VD LBA 200-27F | VD LBA 280-2FF |
| 1 | 80-FF | VD LBA 180-1FF | VD LBA 80-FF | VD LBA 100-17F |
| 0 | 0-7F | VD LBA 0-7F | VD LBA 80-FF | PARITY 0* |

FIG. 5

| SUB-STRIPE NO. | PD LBA | PD 0 | PD 1 | PD 2 |
|---|---|---|---|---|
| 16 | 800-87F | VD LBA 1800-187F | PARITY 10* | VD LBA 1000-107F |
| 15 | 780-7FF | VD LBA 780-7FF | VD LBA F80-FFF | PARITY F** |
| 14 | 700-77F | VD LBA 700-77F | VD LBA F00-F7F | PARITY E** |
| 13 | 680-6FF | VD LBA 680-6FF | VD LBA E80-EFF | PARITY D** |
| 12 | 600-67F | VD LBA 600-67F | VD LBA E00-E7F | PARITY C** |
| 11 | 580-5FF | VD LBA 580-5FF | VD LBA D80-DFF | PARITY B** |
| 10 | 500-57F | VD LBA 500-57F | VD LBA D00-D7F | PARITY A** |
| 9 | 480-4FF | VD LBA 480-4FF | VD LBA C80-CFF | PARITY 9** |
| 8 | 400-47F | VD LBA 400-47F | VD LBA C00-C7F | PARITY 8** |
| 7 | 380-3FF | VD LBA 380-3FF | VD LBA B80-BFF | PARITY 7** |
| 6 | 300-37F | VD LBA 300-37F | VD LBA B00-B7F | PARITY 6** |
| 5 | 280-2FF | VD LBA 280-2FF | VD LBA A80-AFF | PARITY 5** |
| 4 | 200-27F | VD LBA 200-27F | VD LBA A00-A7F | PARITY 4** |
| 3 | 180-1FF | VD LBA 180-1FF | VD LBA 980-9FF | PARITY 3** |
| 2 | 100-17F | VD LBA 100-17F | VD LBA 900-97F | PARITY 2** |
| 1 | 80-FF | VD LBA 80-FF | VD LBA 880-8FF | PARITY 1** |
| 0 | 0-7F | VD LBA 0-7F | VD LBA 800-87F | PARITY 0** |

FIG. 6

SYSTEM AND METHOD FOR HANDLING IO TO DRIVES IN A MEMORY CONSTRAINED ENVIRONMENT

FIELD OF TECHNOLOGY

Embodiments of the present invention relate to redundant storage. More particularly, embodiments of the present invention relate to handling IO to drives in a RAID system.

BACKGROUND

In computing, one type of data storage scheme using multiple storage drives to share or replicate data among the storage drive is referred to as a RAID system. The acronym RAID stands for redundant array of inexpensive disks, or redundant array of independent disks. Depending on the configuration of the RAID system, typically referred to as RAID level, the benefit of RAID can include one or more of increased data integrity, fault tolerance, throughput or capacity when compared to a single drive. One of the most popular RAID levels is RAID5. RAID5 has achieved popularity due to its low cost of redundancy. RAID systems can combine multiple low cost older technology devices into an array that offers greater capacity, reliability, speed, or a combination thereof, than is affordably available in a single device using the latest technology.

In a RAID system, a portion of the storage spaces of one or more physical drives (PD) are mapped to a single virtual drive (VD). The VD presents the storage space distributed amongst one or more PDs as a contiguous array of storage space to an operating system. The operating system sees a single VD. An adapter receives Input and output (IO) commands from the operating system and processes the IO commands to read data from or write data to the VD. The adapter further generates specific IO commands to read or write data to specific portions of the PDs so as to complete the IO commands received from the operating system.

In the process of reading or writing data to the PDs, the adapter temporarily stores the data in a memory, sometimes referred to as cache lines. The data stored in the cache lines are manipulated prior to the completion of the IO commands. The manipulation may involve one or more of arithmetic or logical operation on the data stored. As an example, the manipulation may be to validate the data, As yet another example, the manipulation may be to generate error detection or error correction codes. Another use of a cache line can be to accumulate the data from all PDs that is necessary to satisfy the I/O request before beginning transfer to the host.

Existing techniques may not efficiently allocate and use the cache lines, when limited amount of memory is available to be allocated for cache lines.

SUMMARY

A system and method for handling IO to drives in a RAID system is described. In one embodiment, the method includes processing IO requests to a multiple disk system. A multiple multiple disk system with a predefined strip size is provided. An IO request is received with a logical block address for execution on the multiple disk system. A cache line size from a plurality of cache line sizes is allocated, based on the available memory for allocation to cache line. A plurality of sub-IO requests are generated with a sub-strip size, wherein the sub-strip size is smaller than the strip size, based on the allocated cache line size. The plurality of sub-IO requests are executed with the sub-strip size on the multiple disk system.

In yet another embodiment, a system storage system with a host system, a multi disk system with a predefined strip size and an adapter is provided, The adapter is configured to couple to the host system to receive IO requests for the multi disk system; allocate a cache line size from a plurality of cache line sizes, based on available memory for allocation to the cache line; generate a plurality of sub-IO requests to the multi disk system, with a sub-strip size, wherein the sub-strip size is smaller than the strip size; and process the plurality of sub-IO requests with the sub-strip size on the multi disk system.

In yet another embodiment, an adapter with a cache line is provided. The adapter is configured to couple to a host system to receive IO requests from the host system; couple to a multi disk system with a predefined strip size; generate a plurality of sub-IO requests to the multi disk system, with a sub-strip size, wherein the sub-strip size is smaller than the strip size; and process the plurality of sub-IO requests with the sub-strip size on the multi disk system. The cache line is selectively assigned between a device memory in the host system and an adapter memory in the adapter. The size of the cache line is less than the strip size.

BRIEF DESCRIPTION OF THE DRAWINGS

Various preferred embodiments are described herein with reference to the drawings, wherein:

FIG. 5 illustrates a table with an exemplary logical block address layout in the three disks of the disk array of FIG. 3, for a stripe size of 64 MB;

FIG. 6 illustrates a table with an exemplary logical block address layout in the three disks of the disk array of FIG. 3, for a Sub-stripe size of 64 MB with a stripe size of 1 MB;

The drawings described herein are for illustration purposes only and are not intended to limit the scope of the present disclosure in any way.

DETAILED DESCRIPTION

Systems and method for handling IO requests to drives in a RAID system are disclosed. In the following detailed description of the embodiments of the disclosure, reference is made to the accompanying drawings that form a part hereof, and in which are shown by way of illustration specific embodiments in which the invention may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
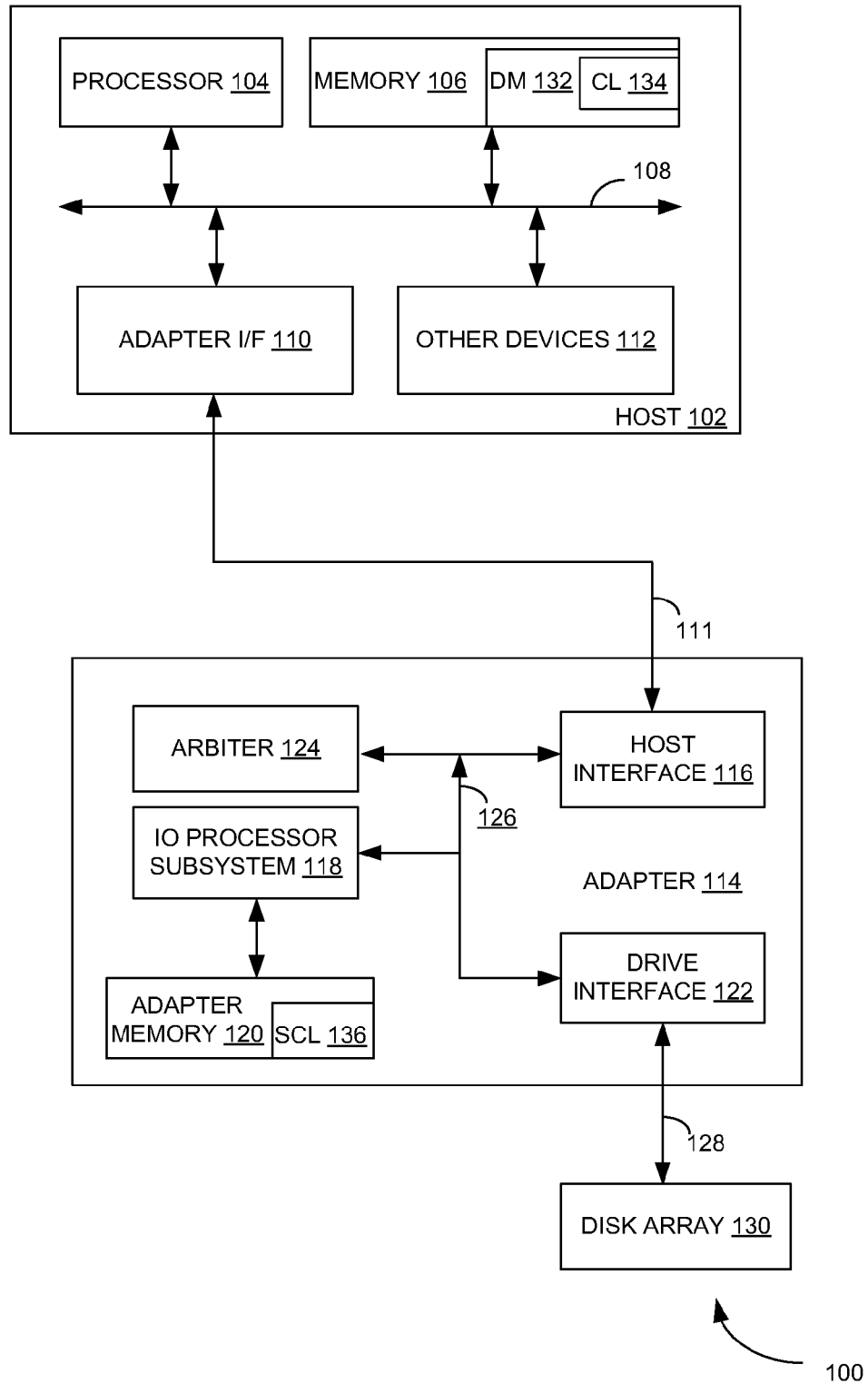
FIG. 1 illustrates an exemplary storage system, according to an embodiment of this disclosure.

More particularly, FIG. 1 is a schematic illustration of components of a storage system 100 in accordance with some embodiments. Storage system 100 may include a computing system 102 (also known as "host system"), an adapter 114 and a disk array 130.

Host system 102 may include a host processor 104, memory 106, other devices 112, adapter interface 110 all operationally coupled via bus 108. Host system 102 interfaces with adapter 114 via Adapter interface 110 and bus 111, which in this case may be a PCI Express bus.

Adapter 114 includes a host interface logic 116, IO Processor Subsystem 118, adapter memory 120, drive interface 122 and arbiter 124. A bus 126 is configured to couple the host interface logic 116, IO Processor subsystem 118, drive interface 122 and arbiter 124. The arbiter 124 manages the communication between the host interface logic 116, IO Processor subsystem 118 and drive interface 122 over the bus 126. In one embodiment, the adapter 114 may be implemented as a single ASIC or as a system-on-chip (SOC).

The host interface logic 116 couples to the bus 111 so as to send and receive commands and data over the bus 111. The IO Processor Subsystem 118 receives the commands from the host computer 102 via the host interface logic 116 and processes the commands. In one embodiment, the IO Processor Subsystem 118 includes one or more processors, registers and local memory to perform various functions. The adapter memory 120 may be used by the IO Processor subsystem 118 to store and retrieve various data needed for the configuration and operation of the adapter 114.

In some embodiments, the size of the adapter memory 120 may be limited and the adapter 114 may be allocated a portion of the memory 106 of the host system 102, as a device memory 132, for use by the adapter 114. The device memory 132 may be used by the IO Processor Subsystem 118 to temporarily store the packets received from the host computer 110 and the disk array 130. A portion of the device memory 132 is allocated as cache lines 134, for use by the IO Processor Subsystem 118. Cache lines 134 may be utilized as a buffer for storing data supplied by a host computer 110 in an I/O write request. Data to be read from, and written to, disk arrays 130 may be staged in cache lines 134.

In the process of reading or writing data to the PDs, the adapter 114 temporarily stores the data in the cache lines 134. The data stored in the cache lines 134 are manipulated prior to the completion of the IO commands. The manipulation may involve one or more of arithmetic or logical operation on the data stored. For example, in some embodiments, the manipulation may be to validate the data, and in yet another embodiment, the manipulation may be to generate error detection or error correction codes. In yet another embodiment, a parity block may be generated using the data stored in the cache lines 134. In some embodiments, cache line can be used to accumulate the data from all PDs that is necessary to satisfy the I/O request before beginning transfer to the host. A direct memory access (DMA) controller may effectuate transfers between elements of the adapter 114.

Those of ordinary skill in the art will recognize a wide variety of equivalent structures to that of storage system 100 of FIG. 1 to provide features and aspects hereof. In particular, numerous additional functional elements may be recognized by those of ordinary skill in the art as desirable for implementing a fully featured adapter 114. Still further, additional integration of components will be readily apparent where, for example, DMA controller and processor may be integrated within a single microcontroller component.

Now, referring back to the adapter 114 of FIG. 1, the drive interface 122 is configured to receive commands from the IO Processor subsystem 118 and communicate with the disk array 130 over the link 128. Various functions and features of the disk array 130 will be further discussed herein with reference to FIGS. 3 and 4.

In some embodiments of the disclosure, the storage space implemented by disk arrays 130 of FIG. 1 may be aggregated into a storage pool of storage space. For example, a set of disk drives from the disk arrays 130 may form a shared storage pool for a number (n) of logical volumes. Further, a subset of drives in the disk arrays 130 may form a redundant array of inexpensive disks (RAID), e.g., with a specified RAID level. Also, in some embodiments, SATA drives may be used to implement massive storage the reliability of which may be kept in check by a RAID implementation.

Figure 2:
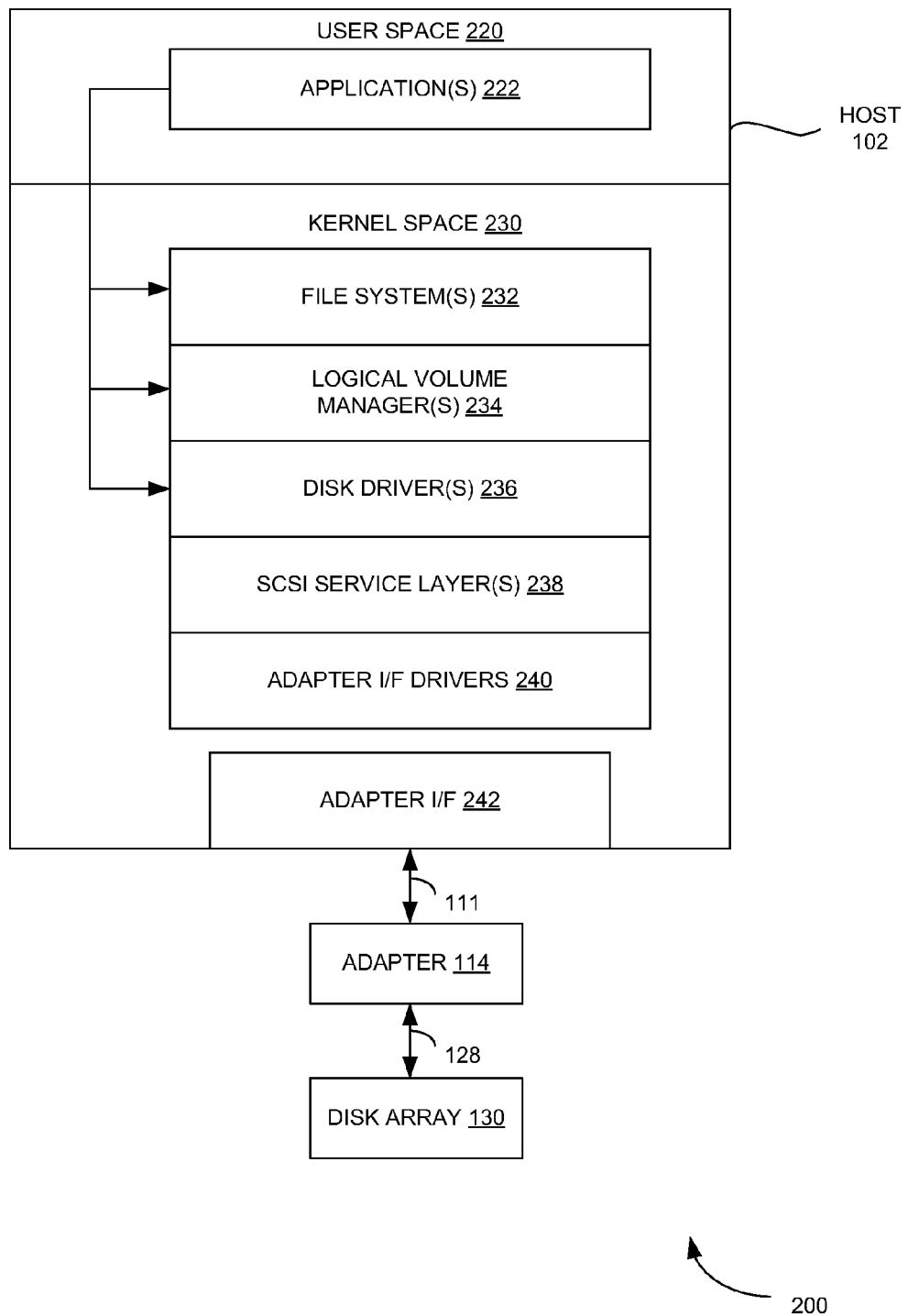
FIG. 2 illustrates a logical view of a storage system, according to an embodiment of this disclosure.

FIG. 2 is a schematic illustration of a logical view of storage system 100. In use, applications executing on host computer 102 may consume storage resources provided by storage system 100. For example, application I/O requests may be passed from an application 222 executing in the user space 220 of the operating system executed on the host computer 102 to the kernel I/O driver stack, and finally through the adapter interface 118 and bus 111 to the adapter 114. The adapter 114 processes the application I/O requests to access the disk array 130 and complete the application I/O requests.

Figure 3:
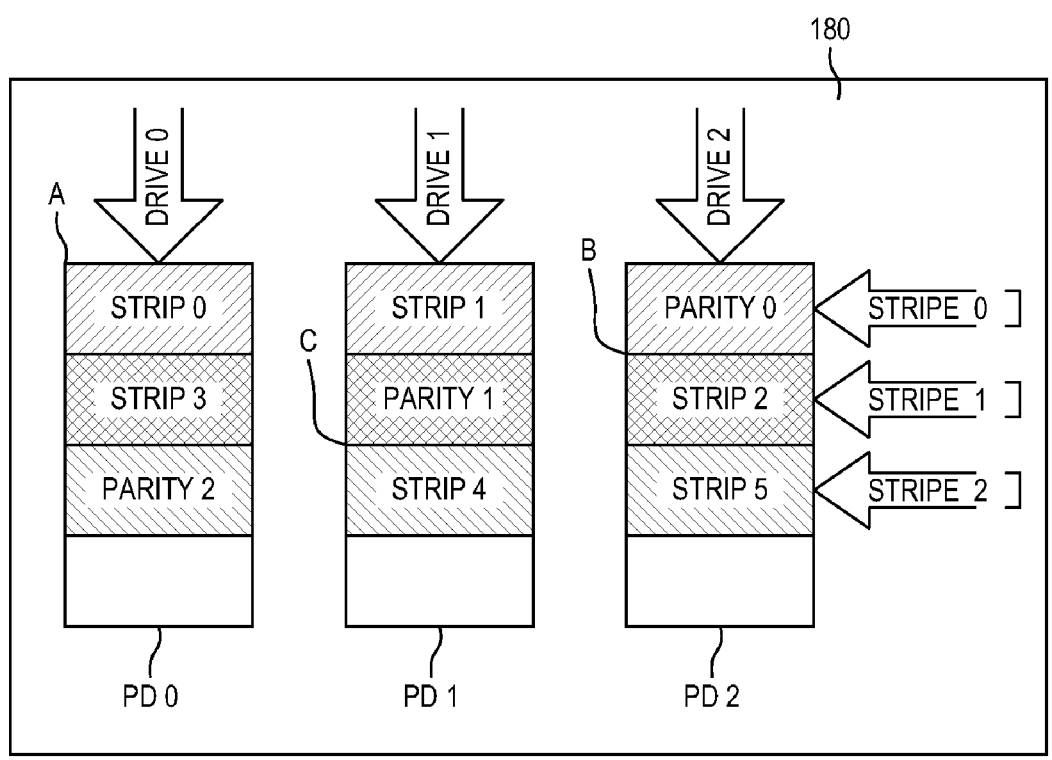
FIG. 3 illustrates an exemplary disc array of a storage system with three disks, arranged as a RAID5 system.

Referring to FIG. 3, a diagram of the disk array 130 is shown illustrating a number of disk drives arranged as a RAID5 system. In one example, the disk array 130 may be implemented with three drives (e.g., PD 0, PD 1 and PD 2). However, the disk array 130 may be implemented with other numbers of drives to meet the design criteria of a particular implementation. A series of strips is collectively called a "stripe". Each strip comprises a number of blocks (or sectors). The disk array 130 may be implemented with RAID5 block level striping with parity data distributed across all member disks. For example a first stripe (e.g., STRIPE 0) may comprise strips 0-1 and a parity block PARITY 0. A second stripe (e.g., STRIPE 1) may comprise strips 2-3 and a parity block PARITY 1. A third stripe (e.g., STRIPE 2) may comprise strips 4-5 and a parity block PARITY 2. A starting point (or sector) for each of the stripes is indicated by the letters A, B and C, respectively. The particular disk used for each parity block (e.g., PARITY 0, PARITY 1, PARITY 2, etc.) is generally staggered from one stripe to the next, hence the term distributed parity blocks.

When a block (or sector) is written to one of the disks in the storage system 100, a parity block is generated within the same stripe. For example, when a strip (e.g., Strip 0), or some portion of the strip, is written on a stripe (e.g., STRIPE 1), the parity strip (e.g., PARITY 0), or some portion of the parity strip, is recalculated and rewritten. For small writes, the old data is read, new parity is written and new data is written.

Figure 4:
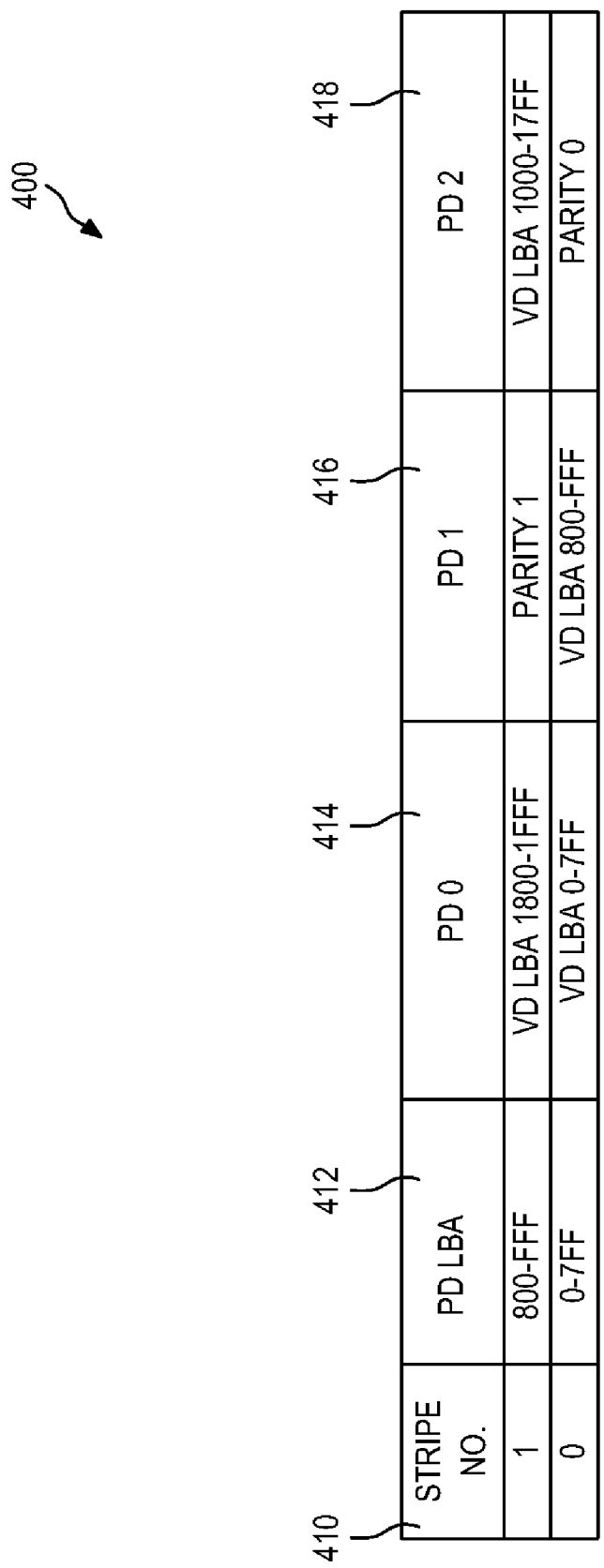
FIG. 4 illustrates a table with an exemplary logical block address layout in the three disks of the disk array of FIG. 3, for a stripe size of 1 MB.

Referring to FIG. 4, a table 400 is shown illustrating an exemplary logical block address layout in the three disk RAID5 storage system 100. In this example, the strip size is 1 MB. For example, with a block size of 512 bytes, one strip is equal to 0x800 blocks (1024 KB). Block size of 512 bytes is exemplary only and other block sizes may be used. Further, the RAID5 configuration has distributed parity.

In some embodiments, the strip size is set up during the initial set up of the disk array 130. The strip size may be set up based upon the application for which the disk array 130 may be used. As an example, the strip size may be set up based on anticipated profile of the read and writes to the disk array 130, so as to optimize the read and writes. Once the strip size is set for a disk array 130, the strip size is preferably maintained to be the same value.

Referring back to table 400 in FIG. 4, Column 410 represents the Stripe Number, Column 412 represents physical disk (PD) logical block address (LBA) for physical disk 0 (PD 0), physical disk 1 (PD 1) and physical disk 2 (PD 2). Columns 414, 416 and 418 represent the virtual disk (VD) LBAs stored in each of the VD's in the corresponding PD LBAs shown in column 412. Incidentally, each of the columns 414, 416 and 418 also correspond to the strips of the indicated stripe in column 410.

For example, for Stripe Number 0, the VD LBA 0-7FF is stored in PD LBA 0-7FF of PD 0, VD LBA 800-FFF is stored in PD LBA 0-7FF of PD 1 and parity for VD LBA 0-7FF and VD LBA 800-FFF is stored in PD LBA 0-7FF of PD 2. Similarly, for Stripe Number 1, VD LBA 1000-17FF is stored in PD LBA 800-FFF of PD 2, VD LBA 1300-1FFF is stored in PD LBA 800-FFF of PD 0 and parity for VD LBA 1000-17FF and VD LBA 1300-1FFF is stored in PD LBA 800-FFF of PD 1. Incidentally, each of the columns 414, 416 and 418 also correspond to the strips of the indicated stripe in column 410.

In operation, the host computer 102 sends IO requests to the adapter 114, indicating the starting VD LBA and the block size for the IO request. The adapter 114 interprets the IO request and sends request to the physical disks in the disk array 130 with PD LBA that correspond to the requested VD LBA for processing. The portions of the physical disks corresponding to the PD LBA are accessed and the IO request is processed, either for a read operation or a write operation.

When the adapter 114 performs certain IO operations, for example, read or writes, the adapter allocates a portion of the device memory 132 to temporarily store data in order to perform intermediate calculations. For example, the adapter 114 may allocate portion of the device memory 132 to perform these calculations. These portions of the device memory 132 may be referred to as cache lines 134. For example, if a full row (or a full stripe) of data is processed, for a disk array 130 with a 1 MB strip size, it may be preferable to allocate 1 MB of cache line 134 for each of the strip.

As an example, for a three disk RAID5 array, three cache lines 134, each of 1 MB size would be preferably allocated in the adapter 114, for a total of 3 MB of memory. It is also preferable to have at least two sets of cache lines so as to process more than one command at a time, thereby allocating 6 MB of memory for the exemplary raid array.

As one skilled in the art appreciates, as the number of disk drives in a disk array increases, amount of memory allocated for cache lines proportionately increases. As the strip size increases, the amount of memory allocated for cache lines increases as well. For example, a disk array with 32 disk drives with a strip size of 1 MB each would require allocation of at least 32 MB of cache lines in the adapter 114, preferably, 64 MB of cache lines, to provide two sets of cache lines.

Once a disk array is set up to operate with a given strip size, for example, 1 MB strip size, it is desirable to maintain same strip size, as reconfiguring a disk array for a different strip size requires rewriting all the disks in the disk array to conform to the new strip size.

Under certain circumstances, the adapter 114 may not have sufficient memory available to assign a cache line commensurate with the strip size of the disk array 130 coupled to the adapter. It may happen for various reasons. For example, a disk array 130 configured for a certain strip size may be coupled to an adapter that may not have sufficient device memory 132 available to allocate a cache line 134 equal to the strip size. This may occur due to limited system resources in the host 102.

In some embodiments, a host 102 may not have sufficient memory to allocate for the cache lines. This may be for various reasons. For example, a portion of the memory may be defective. As another example, the host 102 may still be in the process of initialization or re-initialization and not have allocated the device memory to the adapter 114. In one embodiment, the adapter 114 allocates a portion of the adapter memory 120 as cache line 136. In one embodiment, the function and operation of the cache line 136 may be similar to the function and operation of cache line 134. In one embodiment, the cache line 136 may be smaller in size than the cache line 134.

In one embodiment, the adapter 114 of this disclosure is configured to perform IO operations on a disk array with a predefined strip size, using cache line size less than the predefined strip size. The system and method of this embodiment will be described in detail.

As previously described, table 400 in FIG. 4 illustrates an exemplary logical block address layout in the three disk RAID5 storage system 100. In this example, the strip size is 1 MB. For example, with a block size of 512 bytes, one strip is equal to 0x800 blocks (1024 KB). Block size of 512 bytes is exemplary only and other block sizes may be used. Further, the RAID5 configuration has distributed parity. Although it is preferable to allocate cache lines equal to the strip size, in this case, 1 MB to process IO requests, in one embodiment cache line size less than the strip size, for example, a sub-strip size is allocated to process IO requests. As an example, a cache line size of 64 KB is allocated to process the IO requests. In this case, the sub-strip size is 64 KB.

Now referring to table 500 in FIG. 5, an exemplary logical block address layout with strip size of 64 MB is shown. For example, with a block size of 512 bytes, one strip is equal to 0x80 blocks (64 KB). Block size of 512 bytes is exemplary only and other block sizes may be used. Column 510 represents the Stripe Number, Column 512 represents physical disk (PD) logical block address (LBA) for physical disk 0 (PD 0), physical disk 1 (PD 1) and physical disk 2 (PD 2). Columns 514, 516 and 518 represent the virtual disk (VD) LBAs stored in each of the VD's in the corresponding PD LBAs shown in column 512. Incidentally, each of the columns 514, 516 and 518 also correspond to the strips of the indicated stripe in column 510. In this example, the strip size is 64 KB.

For example, for Stripe Number 0, the VD LBA 0-7F is stored in PD LBA 0-7F of PD 0, VD LBA 80-FF is stored in PD LBA 0-7F of PD 1. Parity for VD LBA 0-7F and VD LBA 80-FF is stored in PD LBA 0-7F of PD 2 and indicated as Parity 0*. Similarly, for Stripe Number 1, VD LBA 100-17F is stored in PD LBA 80-FF of PD 2, VD LBA 130-1 FF is stored in PD LBA 80-FF of PD 0. Parity for VD LBA 100-17F and VD LBA 130-1 FF is stored in PD LBA 80-FF of PD 1 and indicated as Parity 1*.

Now, comparing table 400 of FIG. 4 for strip size of 1 MB with table 500 of FIG. 5 for a strip size of 64 MB, one skilled in the art appreciates that the physical layout of the data for the VD LBAs do not completely match. As an example, referring to table 400, the VD LBA 80-FF for the disk array with 1 MB strip size will be located on PD 0, in stripe 0. On the other hand, referring to table 500, the VD LBA 80-FF for the disk array with 64 MB strip size will be located on PD 1 in stripe 0. Therefore, if a host requests VD LBA 80-FF to be read from a disk array with 1 MB strip size, the adapter configured to operate with 64 KB strip size needs to manipulate the IO command issued to the physical disk so as to retrieve correct portion of the data from the physical disk, in this example, from PD 0 instead of PD 1. The manipulation of the IO commands with sub-strip size will now be described with reference to table 600 of FIG. 6.

Now referring to table 600 in FIG. 6, an exemplary logical block address layout with Sub-strip size of 64 MB for a 3 disk array with a strip size of 1 MB is shown. For example, one sub-strip is equal to 0x80 blocks (64 KB). Column 610 represents the Sub-stripe Number, Column 612 represents physical disk (PD) logical block address (LBA) for physical disk 0 (PD 0), physical disk 1 (PD 1) and physical disk 2 (PD 2). Columns 614, 616 and 618 represent the virtual disk (VD) LBAs stored in each of the VD's in the corresponding PD LBAs shown in column 612. Incidentally, each of the columns 614, 616 and 618 also correspond to the Sub-strips of the indicated Sub-stripe in column 610. In this example, the Sub-strip size is 64 KB.

For example, for Sub-stripe Number 0, the VD LBA 0-7F is stored in PD LBA 0-7F of PD 0, VD LBA 800-8FF is stored in PD LBA 0-7F of PD 1. Parity for VD LBA 0-7F and VD LBA 800-8FF is stored in PD LBA 0-7F of PD 2 and indicated as Parity **0\*\*. Similarly, for Sub-stripe Number 1, VD LBA 80-FF is stored in PD LBA 80-FF of PD 0, VD LBA 880-8FF is stored in PD LBA 80-FF of PD 1. Parity for VD LBA 80-FF and VD LBA 880-8FF is stored in PD LBA 80-FF of PD 1 and indicated as Parity 1\*\***.

As one skilled in the art appreciates, referring to table 600, the VD LBA 0-7FF is stored in Sub-strips 0-15 on PD 0. Similarly, VD LBA 800-FFF is stored in Sub-strips 0-15 on PD 1. And, the corresponding parity for each of the Sub-strips 0-15 is stored on PD 2. This layout corresponds to the Stripe 0 of table 400 depicting a 1 MB strip size.

Therefore, if a host requests VD LBA 80-FF to be read from a disk array with 1 MB strip size, the adapter configured to operate with 64 KB strip size manipulates the command issued to the physical disk so as to retrieve correct portion of the data from the physical disk, in this example, from PD LBA 80-FF of PD 0, as described with reference to table 600.

In some embodiments, a cache line size of 64 KB may not be available. For example, the cache line 134 may not be available from the host memory 132. Instead, the adapter 114 may have to assign a cache line 136 from a portion of the adapter memory 120. In some embodiments, available memory for allocation from adapter memory 120 may be limited and in the order of multiples of a block size. (in this example, the block size is 512 bytes) For example, a minimum cache line size may be a multiple of number of PDs and block size. In some embodiments, it is preferable to allocate two cache lines per VD. In such a scenario, minimum cache line size will be 2×(# of PDs in VD)×block size.

Figure 7:
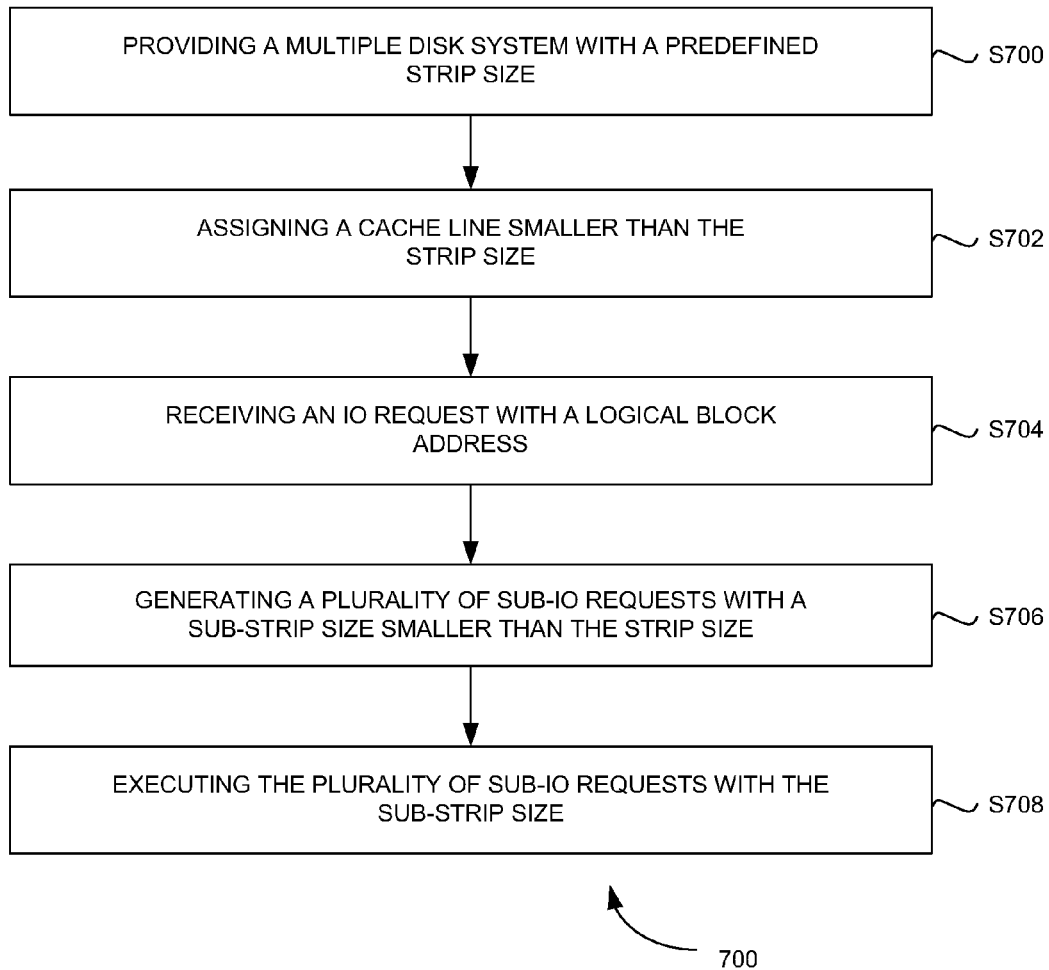
FIG. 7 illustrates a method for processing IO requests to a disk array using a Sub-strip size smaller than the Strip size of the disk array, according to an embodiment of the disclosure.

Now, referring to FIG. 7, a method for processing IO requests to a multi disk system is described.

In block S700, a multi disk system with a predefined strip size is provided. For example, the multi disk system may be a disk array 130. In one embodiment, the multi disk system may be a RAID5 system. The disk array 130 may be initialized to have a predefined strip size. In one example, the disk array 130 has three disk drives, with a strip size of 1 MB. The RAID5 system may be set up to have distributed parity, so that parity is distributed amongst all three drives.

In block S702, an IO request with a logical block address is received. For example, the storage adapter 114 receives an IO request from a host, for example, computer system 110. The IO request from the computer system includes a starting logical block address (VD LBA) for the virtual disk and a block count (BC). The starting logical block address may be the virtual address of the starting block of data to be processed and block count provides the number of blocks to be transferred to or from the virtual disk. As an example, the starting logical block address may be VD LBA 80 and block count may be 256 blocks.

In block S704, a cache line size from a plurality of cache line sizes is allocated to process the IO requests. In one embodiment, the cache line size is smaller than the strip size. For example, a cache line size smaller than 1 MB is assigned to process the request. In one embodiment, the adapter 114 assigns a larger cache line, if there is sufficient memory available to assign to the cache line, for example, if sufficient device memory 132 is allocated to the adapter 114. For example, if sufficient device memory 132 is allocated to the adapter 114, a cache line size of 64 MB may be assigned to process the IO request.

On the other hand, the adapter 114 may allocate a portion of the adapter memory 120 for use as a cache line. In one embodiment, the adapter 114 may allocate at a minimum, sufficient memory as cache line to store at least one block of data for each of the PDs. In some embodiments, the adapter 114 may allocate memory sufficient to define two cache lines, so that two IO requests may be processed. In one embodiment, the adapter 114 may determine the amount of memory 136 available for allocation to the cache lines and allocate multiples of blocks of data for each of the PDs. Block S704 will be further described with reference to FIG. 7A.

In block S706, a plurality of sub-IO requests with a sub-strip size smaller than the strip size is generated. For example, the strip size is 1 MB.

In one embodiment, the sub-strip size is 64 MB, if for example, sufficient device memory is available for use by the adapter 114. In one embodiment, the sub-strip size corresponds to the cache line size. In one example, each 64 MB of data may correspond to 128 blocks of data. For a block count of 256, there will be a need to generate two sub-IO commands, each with a block count of 128. Now using mapping of VD LBA to the PD LBA for each of the physical drives PD 0, PD 1 and PD 2 (as depicted in table 600), the adapter will generate a first sub-IO command with a starting physical block address (PD LBA) of 80, with a block count of 128 to physical disk PD 0, which corresponds to VD LBA 80-FF. Similarly, the adapter will generate a second sub-IO command with a starting physical block address (PD LBA) of 100, with a block count of 128 to physical disk PD 0, which corresponds to VD LBA 100-17F.

In one embodiment, the allocated cache line size may be 512 KB, thus the sub-strip size of 512 KB, which corresponds to one block of data. In this embodiment, 256 sub-IO commands will be issued, to read 256 blocks of data. For example, the adapter will generate a first sub-IO command, with a physical block address (PD LBA) of 80, with a block count of 1 to physical disk PD0, which corresponds to VD LBA 80. Thereafter, the adapter will generate additional sub-IO commands, incrementing the physical block address (PD LBA), with a block count of 1, until all the blocks (in this case 256 blocks) are read.

In block S708, the plurality of sub-IO requests are executed, with the sub-strip size. For example, the plurality of sub-IO commands are processed by the adapter and corresponding IO requests are executed on the physical disks of the disk array 130. If the IO request was for a read operation, the starting PD LBA and the block count is used by the disk array to transfer the corresponding blocks of data back to the adapter. The received data is then stored in the cache lines 134 of the storage adapter 114. After processing the received data, the storage adapter 114 transfers the data to the host computer. For example, the storage adapter 114 may validate the received data for any errors and execute any error recovery methods to detect or correct the data.

If the IO request was for a write operation, the data is stored in the cache lines 134 of the storage adapter 114. Then, the data is written to the physical disk PD 0. Additionally, parity data is generated for the data along with the data in other drive (for example, PD 1 in this case) and the generated parity data is written to the physical disk PD 1. For example, the storage adapter 114 may read the data from PD1 into the cache lines 134 and then, generate a new parity based upon the new data to be written to PD 0. Upon successful completion of all the sub-IO commands, the adapter reports the status to the host computer.

Figure 7A:
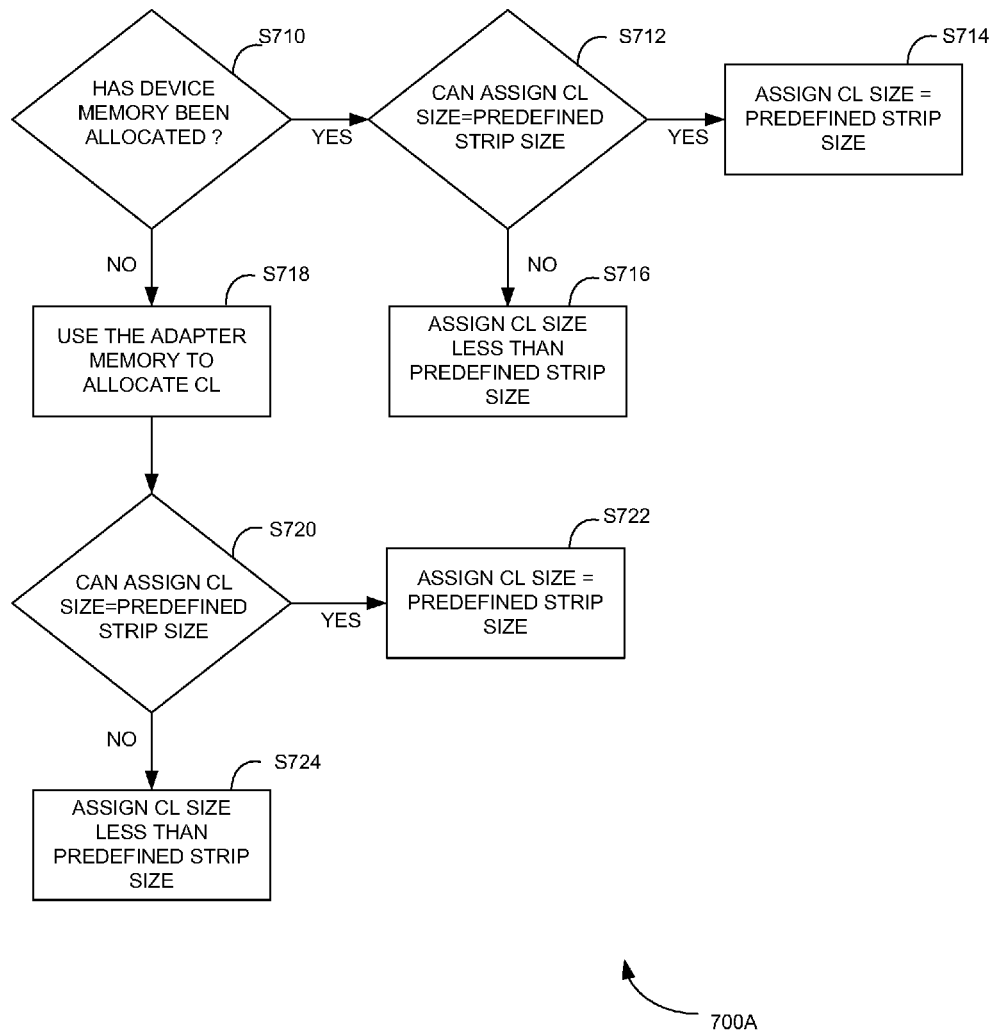
FIG. 7A illustrates a method for allocating a cache line size, according to an embodiment of the disclosure.

Now, referring to FIG. 7A, allocating a cache line size will be further described. In block S710, if the device memory has been allocated by the host is checked. For example, the adapter 114 may maintain a data structure in the adapter memory 120 to indicate if the device memory 132 has been allocated by the host 102 to the adapter 114. If the device memory 132 has been allocated to the adapter 114, the adapter 114 checks the available device memory 132 to allocate for the cache line.

In block S712, if the adapter 114 can allocate cache line size equal to the predefined strip size of the VDs (for example, 1 MB strip size), in block S714, the adapter 114 allocates cache line size equal to the predefined strip size. If in block S712, the adapter cannot allocate cache line size equal to the predefined strip size, the adapter in block S716 allocates a cache line size less than the predefined strip size, for example a sub-strip size. In one example, the sub-strip size is 64 KB.

In block S710, if the device memory has not been allocated, in block S718, the adapter 114 uses the adapter memory to allocate the cache line. In block S720, the adapter checks the available adapter memory for allocation to the cache line. if the available adapter memory is sufficient to allocate a cache line size equal to the predefined strip size, in block S722, the adapter 114 allocates a cache line size to be equal to the predefined strip size.

In block S720, if the available adapter memory is not sufficient to allocate a cache line size equal to the predefined strip size, in block S724, the adapter 114 allocates a cache line size less than the predefined strip size. In one embodiment, the allocated cache line size may be as small as one block per PD. In one embodiment, the adapter allocates maximum available adapter memory for cache line size.

In the example described with reference to FIG. 7, the starting VD LBA was aligned to the start of a sub-strip and the block count was a multiple of the sub-strip size. Now, with reference to FIG. 8, method for processing IO requests to a multi disk system is described for some of the other scenarios for starting VD LBA and block count. For example, the starting VD LBA of an IO request may not align with the starting address of the strip. And, in some cases, the block count may not be a multiple of the Sub-strip size.

Figure 8:
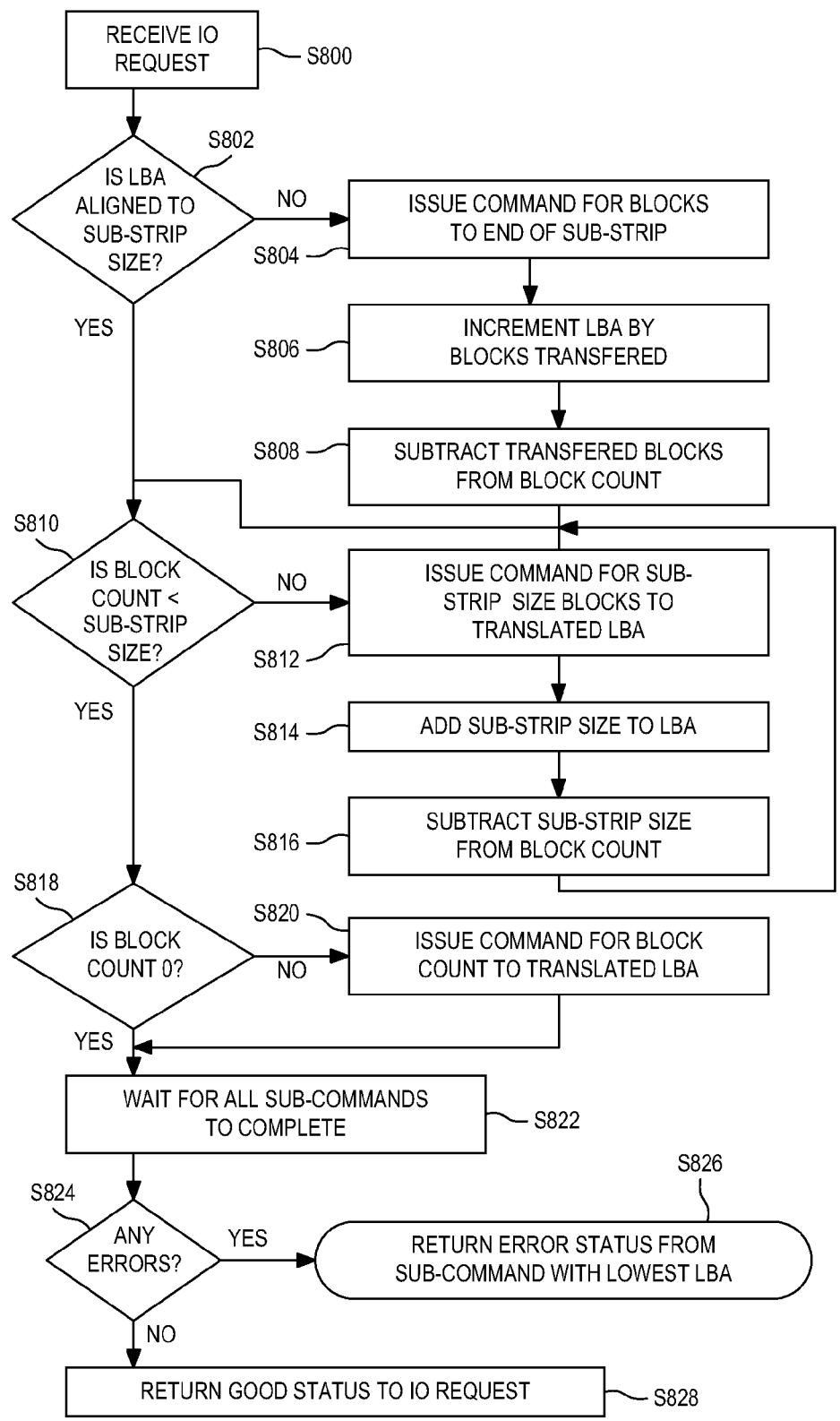
FIG. 8 illustrates another method for processing IO requests to a disk array using a Sub-strip size smaller than the Strip size of the disk array.

Now referring to FIG. 8, in block S800, an IO request with a logical bloc address and a block count is received. This block may be similar to block S702 described with reference to FIG. 7. For example, the storage adapter 114 receives an IO request from a host, for example, computer system 110. The IO request from the computer system includes a logical block address (VD LBA) for the virtual disk and a block count (BC). The logical block address may be the address of the starting block of data to be processed and block count provides the number of blocks to be transferred to or from the virtual disk.

In block S802, the received starting VD LBA is checked to see if it aligns with the sub-strip size. In one embodiment, the adapter 114 may use a stored table similar to table 600 to verify if the VD LBA aligns with the sub-strip size. For example, VD LBA 0, 80, 100, 130 etc are aligned with the sub-strip size of 64 KB (i.e., the VD LBA corresponds to the starting VD LBA of the sub-strip). In some embodiments, other mechanisms may be used to determine the alignment, for example using mathematical manipulation of the VD LBA to determine the alignment.

If the received starting VD LBA is not aligned, in block S804, a sub-IO request is generated with a translated LBA corresponding to the VD LBA and a block count equal to the number of block counts to the end of the sub-strip. As an example, if the starting VD LBA points to block 10 of the sub-strip and number of blocks in the sub-strip are 128 blocks, the block count of the sub-IO request will be 118 blocks. In this way, IO request is processed for a portion of the sub-strip.

In block S806, the VD LBA is incremented by the number of blocks processed. The incremented VD LBA now points to the beginning (or the start of first block) of the next sub-strip to be processed and aligned to the sub-strip size.

In block S808, the processed block count is decremented from the block count.

In block S810, the block count is compared with the sub-strip size.

If the block count is less than the sub-strip size, in block S812, a sub-IO command is issued for sub-strip size blocks to the translated LBA of the incremented VD LBA. In block S814, the sub-strip size is added to the VD LBA and in block S816, the sub-strip size is subtracted from the block count.

Now, the subtracted block count is again compared with the sub-strip size in block S810. If the block count is less than the sub-strip size, in block S818, if the block count is not equal to zero, in block S820 a sub-IO command is issued for remaining block counts, using the translated LBA.

In block S822, if all sub-IO commands are completed, in block S824 status of all sub-IO commands are verified for any errors.

If in block S824, there was an error, in block S826, an error status is returned to the host, with sub-command with lowest VD LBA. In this way, partial successful completion of the IO request is communicated to the host by the adapter.

If in block S824, there was no error, in block S828, a good status is returned to the host by the adapter. In this way, successful completion of the IO request is communicated to the host by the adapter.

In the above example, a sub-strip size of 64 KB was used, which equated to 128 blocks of data. If instead, a smaller sub-strip size was chosen based upon the allocated cache line size, for example, a size corresponding to fewer number of blocks, according to the method described above, a plurality of sub-IO commands will be issued to transfer same amount of data as transferred using a sub-strip size of 64 KB.

As one skilled in the art appreciates, the method and system described herein uses sub-IO commands with a block count less than or equal to the strip size. Additionally, the VD LBA is translated so as to access correct PD LBAs for a disk array with a predefined strip size that is larger than the sub-strip size. The system and method further permits the use of cache lines smaller than the strip size of the disk array, to process IO request from host system to the disk array.

The method and system described herein is also applicable to other RAID levels besides RAID5. For example, RAID 5E and RAID 5EE have a similar data layout, except a portion of the PDs is reserved for reconstructing data from a failed PD. RAID 6 has two parity strips per stripe—the second of which may be an exclusive—OR of independent blocks or the result of a Galois transformation of a finite field. RAID 0 is similar to RAID 5, but there isn't a parity strip. RAID 1 is striped, but there isn't parity and the drives are copies of each other. These primary RAI levels can also be combined, such as RAID 50, which is a multiple RAID 5 arrays that are striped together so that the VD data space is a sum of the RAID 5 arrays.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method for processing IO requests to a multiple disk system, comprising:
providing the multiple disk system with a predefined strip size;
receiving an IO request with a logical block address for execution on the multiple disk system;
allocating a cache line size from a plurality of cache line sizes, based on available memory for allocation to the cache line;
generating a plurality of sub-IO requests with a sub-strip size, wherein the sub-strip size is smaller than the predefined strip size, based on the allocated cache line size; and
executing the plurality of sub-IO requests with the sub-strip size on the multiple disk system.

2. The method of claim 1, further comprising comparing the strip size to a threshold value and dividing the IO request if the strip size is greater than the threshold value.

3. The method of claim 2, wherein the multiple disk system comprises a RAID5 system.

4. The method of claim 1, wherein generating the plurality of sub-IO requests further comprises translating the logical block address to a physical block address corresponding to the sub-strip size.

5. The method of claim 1, further comprising assigning a cache line size substantially equal to the sub-strip size, to process the IO requests.

6. A storage system, comprising:
a host system;
a multi disk system with a predefined strip size; and
an adapter configured to
couple to the host system to receive IO requests for the multi disk system, from the host system;
allocate a cache line size from a plurality of cache line sizes, based on available memory for allocation to the cache line;
generate a plurality of sub-IO requests to the multi disk system, with a sub-strip size, wherein the sub-strip size is smaller than the strip size; and
process the plurality of sub-IO requests with the sub-strip size on the multi disk system.

7. The storage system of claim 6, wherein the allocated cache line size is less than the strip size.

8. The storage system of claim 7, wherein the size of the cache line is substantially equal to the sub-strip size.

9. The storage system of claim 6, wherein the multiple disk system comprises a RAID5 system.

10. An adapter, comprising:
a cache line; and
wherein, the adapter is configured to
couple to a host system to receive IO requests from the host system;
couple to a multi disk system with a predefined strip size;
generate a plurality of sub-IO requests to the multi disk system, with a sub-strip size, wherein the sub-strip size is smaller than the strip size;
process the plurality of sub-IO requests with the sub-strip size on the multi disk system;
wherein the cache line is selectively assigned between a device memory in the host system and an adapter memory in the adapter; and
wherein the size of the cache line is less than the strip size.

11. The adapter of claim 10, wherein the size of the cache line is substantially equal to the sub-strip size.

12. The adapter of claim 10, wherein the multiple disk system comprises a RAID5 system.

* * * * *